United States Patent [19]

Burke

[11] Patent Number: 4,989,805

[45] Date of Patent: Feb. 5, 1991

[54] RETRACTABLE REEL ASSEMBLY FOR TELEPHONE EXTENSION CORD

[76] Inventor: Paul C. Burke, P.O. Box 324, Lake Forest, Ill. 60045

[21] Appl. No.: 267,184

[22] Filed: Nov. 4, 1988

[51] Int. Cl.⁵ .............................................. B65H 75/48
[52] U.S. Cl. ................................ 242/107.1; 242/107.7
[58] Field of Search ............ 242/107.1, 107.11, 107.12, 242/107.13, 107.14, 107.7, 107.15; 379/442, 441, 454; 191/12.2 R

[56] References Cited

U.S. PATENT DOCUMENTS

| | | | |
|---|---|---|---|
| 1,276,825 | 8/1918 | swope | 242/107.1 |
| 1,446,410 | 2/1923 | Bennett et al. | 242/107.1 |
| 1,737,978 | 12/1929 | Sebell . | |
| 1,865,069 | 6/1932 | Allen . | |
| 1,958,626 | 5/1934 | Krantz | 242/107.7 |
| 2,206,352 | 7/1940 | Hellmann . | |
| 2,211,561 | 8/1940 | Flannelly . | |
| 2,262,587 | 11/1941 | Kaempf . | |
| 2,678,779 | 5/1954 | Bellmer . | |
| 2,979,576 | 4/1961 | Huber | 242/107.7 |
| 3,061,234 | 10/1962 | Morey | 242/107.1 |
| 3,584,157 | 6/1971 | Prescott . | |
| 3,657,491 | 4/1972 | Ryder et al. | 242/107.7 X |
| 4,053,118 | 10/1977 | Aikins | 242/107.11 |
| 4,062,608 | 12/1977 | Pierce . | |
| 4,384,688 | 5/1983 | Smith | 242/107.7 |
| 4,472,010 | 9/1984 | Parnello . | |
| 4,646,987 | 3/1987 | Peterson | 242/107.11 |

FOREIGN PATENT DOCUMENTS 171356  11/1951  Fed. Rep. of Germany ... 242/107.1

Primary Examiner—John M. Jillions
Attorney, Agent, or Firm—Wood, Phillips, Mason, Recktenwald & Vansanten

[57] ABSTRACT

To provide a highly functional yet very compact retractable reel assembly for a telephone extension cord, a housing is provided which is adapted to be mounted on a wall in proximity to a telephone or telephone jack for utilization with either wall mounted or table telephones, respectively. The retractable reel assembly includes a reel biased for rotation in one direction, a ratchet for selectively restraining rotation of the reel in the one direction, and an expansion chamber for a length of the cord within the housing, whereby the portion of the cord leading to the telephone or telephone jack can normally be wound in a radially and axially confined planar helical array. With this arrangement, the retractable reel assembly can allow the portion of the cord to be repositioned to a radially expanded helical array during withdrawal of the remainder of the cord from the housing and returned to the radially and axially confined helical array during retraction of the remainder of the cord into the housing.

15 Claims, 2 Drawing Sheets

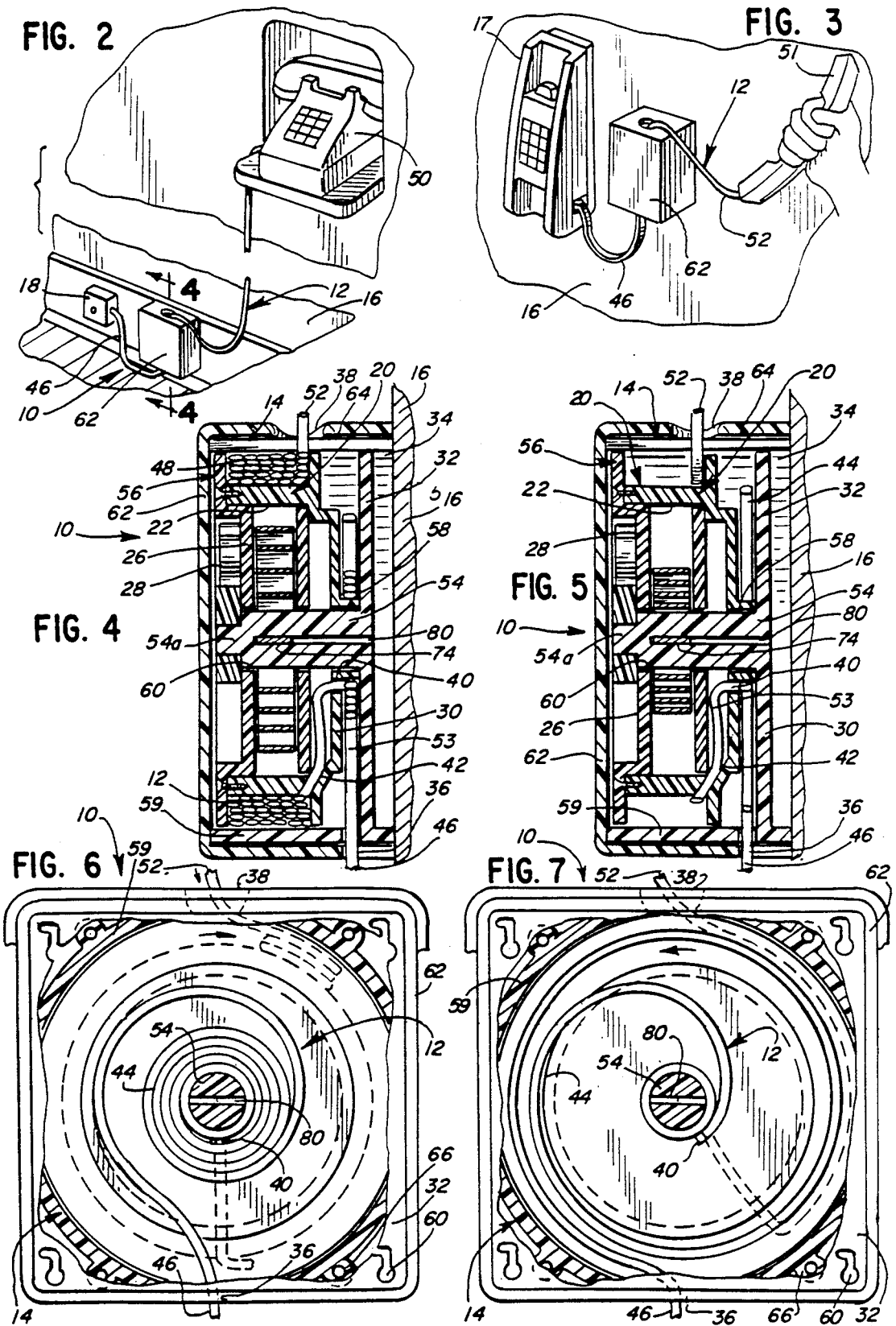

RETRACTABLE REEL ASSEMBLY FOR TELEPHONE EXTENSION CORD

FIELD OF THE INVENTION

The present invention relates generally to elongated cord storage devices and, more particularly, to a retractable reel assembly for a telephone or other communications extension cord.

BACKGROUND OF THE INVENTION

Over the years, there have been many attempts to provide retractable reels for a diverse multitude of applications. For instance, it has been recognized that retractable reels have application for long extendible electrical cords, signal cables, water hoses, air hoses, and the like, which preferably remain attached or connected at their source but, nevertheless, present a problem relative to storage during periods in which they are not in use. In one particular application, the desirability of a retractable reel assembly for telephone extension cords has been recognized.

For instance, U.S. Pat. No. 1,276,825, issued on Aug. 27, 1918, to D. Swope discloses a reel disposed within a box wherein a loaded spring is utilized. A cord extends from a signal box, enters the box, and is wrapped around a spindle, and the cord is then wrapped around a reel, exits the box, and is secured to a telephone. Unfortunately, Swope requires a spindle device in which the cord is wrapped in an extended axial direction, greatly increasing the size of the box.

Furthermore, Swope does not disclose any means for restraining retraction of the cord and, thus, the cord is in constant tension and, upon releasing the telephone, the cord will automatically be retracted into the box.

U.S. Pat. No. 4,384,688, issued on May 24, 1983 to J. N. Smith discloses a retractable reel which permits the extension and retraction of a cord through a pair of openings. Smith uses a loaded spring for retracting the cord. Further, Smith provides a ratchet gear having a pawl with an accompanying spring to retain the cord in a selected position of extension.

Nevertheless, Smith must provide a recess in a sidewall to permit a clamp to fit within the structure, and the cord must be coiled over a portion of its length where it exits the housing. Further, Smith teaches the necessity of the coiled cord exiting the housing axially and, as a result, is entirely unsuited for mounting on a wall in proximity to a telephone jack.

Still other attempts to deal with the problem of providing a retractable reel assembly for a telephone extension cord are disclosed in the prior art in a wide variety of embodiments. Among these are Pierce U.S. Pat. No. 4,062,608; Prescott U.S. Pat. No. 3,584,157; Bellmer U.S. Pat. No. 2,678,779; Kaempf U.S. Pat. No. 2,262,587; Flannelly U.S. Pat. No. 2,211,561; Hellmann U.S. Pat. No. 2,206,352; Allen U.S. Pat. No. 1,865,069; and Sebell U.S. Pat. No. 1,737,978. However, no one has succeeded in providing a compact housing to be mounted on a wall in proximity to a telephone jack for withdrawal and retraction of a telephone extension cord.

Accordingly, it is an object of the present invention to provide a compact retractable reel assembly for a telephone extension cord.

It is a further object of the present invention to provide such a retractable reel assembly where the housing can be mounted at a selected location along a wall in proximity to a telephone or telephone jack so as to be relatively inconspicuous.

It is also an object of the present invention to provide such a retractable reel assembly where the housing can be mounted on a wall at varying distances from a telephone or telephone jack by reason of an excess of telephone extension cord.

It is a still further object of the present invention to provide such a retractable reel assembly where the telephone extension cord can be withdrawn from the housing to a selected point, retained at that selected point, and later withdrawn back into the housing.

Additionally, it is an object of the present invention to provide such a retractable reel assembly where the telephone extension cord feeds the signal directly through the assembly without the utilization of movable contacts.

The present invention is directed to overcoming the above stated problems and accomplishing the stated objects by providing an improved and compact retractable reel assembly for a telephone extension cord.

SUMMARY OF THE INVENTION

Accordingly, the present invention is directed to a retractable reel assembly for a telephone or other communications extension cord (hereinafter collectively referred to as telephone extension cord) having a housing adapted to be mounted on a wall in proximity to a telephone or telephone jack. The retractable reel assembly includes a reel defined by a cylindrical wall and journaled for rotation about an axis in the housing, a spring for biasing the reel for rotation in one direction, and a ratchet in the housing for selectively restraining rotation of the reel in the one direction. As will be appreciated, the spring is mounted to extend between the housing and the reel to cause the biasing of the reel for rotation in the one direction for retraction of the telephone extension cord.

In the exemplary embodiment, the reel has a cord-retaining radial wall on at least one side thereof, which is disposed in closely spaced adjacent relation to a wall of the housing to define a radial cord expansion chamber in the housing. The housing has a first opening disposed about the perimeter thereof leading to the expansion chamber and a second opening disposed about the perimeter thereof leading from the reel and the first and second openings are axially spaced from one another. Additionally, the reel has an axially extending aperture in the radial wall leading from the expansion chamber in closely spaced adjacent relation to the axis of the reel and also has a radially extending aperture in the cylindrical wall.

With this construction, the cord includes a first portion normally wound in a radially confined helical array about the axis of the reel in the expansion chamber. The first portion of the cord is maintained in an axially confined planar helical array by the radial wall of the reel and the housing wall and is of a length to permit withdrawal of at least a portion thereof to reach the telephone or telephone jack. Furthermore, the first portion of the cord has an end extending from the first opening in the housing for connection to the telephone or telephone jack.

With this construction, the cord also includes a second portion normally substantially entirely wound on the cylindrical wall of the reel. The second portion of the cord is of a length to permit withdrawal of at least a portion thereof by pulling on the second portion of the cord to rotate the reel in a direction opposite the one direction of spring biasing to accommodate movement of a telephone from one location to another. Additionally, the second portion of the cord has an end extending from the second opening in the housing for connection to the telephone or telephone handset.

As will be appreciated, the cord extends through the axially extending aperture in the radial wall of the reel and the radially extending aperture in the cylindrical wall of the reel to join the first and second portions thereof. It will, in fact, be appreciated that the entire cord is entirely integral. In the preferred embodiment, the cord is flat and includes a plug-in connector on one end thereof for connection to the telephone jack or telephone and a plug-in connector on the other end thereof for connection to the telephone or telephone handset, respectively.

In the preferred embodiment, the first portion of the cord is capable of being repositioned to a radially expanded helical array during withdrawal of the second portion of the cord. This is accommodated by reason of the initially radially confined helical array into which the first portion of the cord is normally wound, and by reason of the cooperation of the expansion chamber in maintaining the cord in the axially confined planar helical array. Similarly, the first portion of the cord is capable of being returned to the radially confined helical array during retraction of the second portion of the cord.

Preferably, the housing includes a spindle and the reel is carried by the spindle for rotation thereon. The spindle is advantageously integral with the housing. In addition, the spring is mounted so as to extend between the reel and the spindle of the housing.

Further, the reel preferably has a cord-retaining radial wall on both sides thereof maintained in spaced apart relation by the spindle. The spring is then disposed between the radial walls and radially inwardly of the cylindrical wall of the reel. With this arrangement, the spindle is adapted to extend through coaxial spindle-receiving bores in the respective radial walls.

In addition, one of the radial walls advantageously has a disc portion axially recessed within the cylindrical wall of the reel. The ratchet can then be mounted within the axially recessed disc portion of the one of the radial walls. By reason of this arrangement of the components, the retractable reel assembly is rendered highly functional while at the same time being desirably compact.

Other objects, advantages, and features of the present invention will become apparent from the following specification taken in conjunction with the accompanying drawings.

BRIEF DESCRIPTION OF THE DRAWINGS

FIG. 2 is a perspective view illustrating the retractable reel assembly in a first wall-mounted position;

FIG. 3 is a perspective view illustrating the retractable reel assembly in a second wall-mounted position;

FIG. 4 is a cross-sectional view taken on the line 4—4 of FIG. 2 illustrating the components when the cord is fully retracted;

FIG. 5 is a cross-sectional view taken on the line 5—5 of FIG. 2 illustrating the components when the cord is fully withdrawn;

FIG. 6 is a rear elevational view, with the housing wall removed, illustrating the components when the cord is fully retracted; and FIG. 7 is a rear elevational view, with the housing wall removed, illustrating the components when the cord is fully withdrawn.

DETAILED DESCRIPTION OF THE PREFERRED EMBODIMENT

Figure 1:
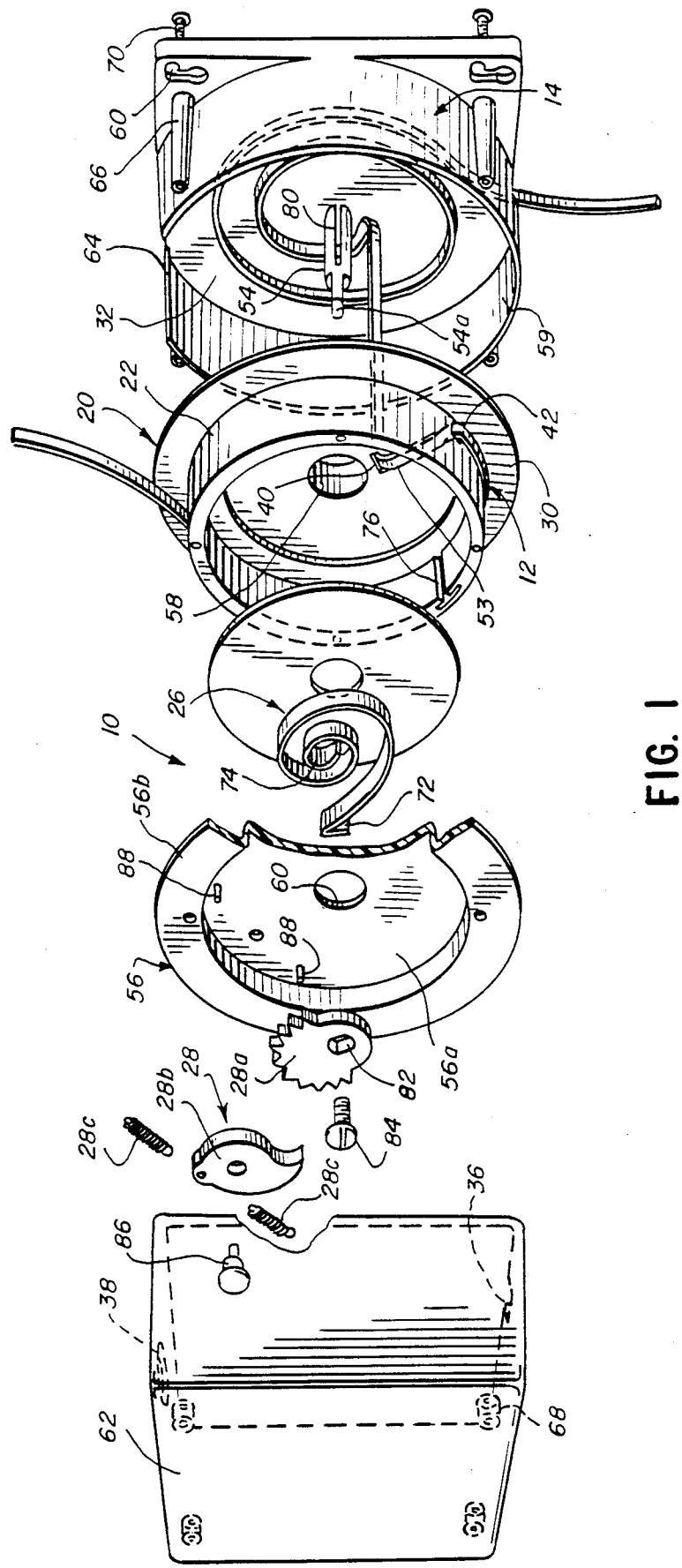
FIG. 1 is an exploded perspective view illustrating a retractable reel assembly for a telephone extension cord in accordance with the present invention.

Referring to the drawings, and first to FIGS. 1 through 3, the reference numeral 10 designates generally a retractable reel assembly for a telephone extension cord 12 including a housing 14 adapted to be mounted on a wall 16 in proximity to a telephone 17 or a telephone jack 18 for use with either wall mounted or table telephones, respectively. The retractable reel assembly 10 includes a reel 20 defined by a cylindrical wall 22 journaled for rotation about an axis 24 in the housing 14, a spring 26 mounted to extend between the housing 14 and the reel 20 for biasing the reel for rotation in one direction, and a ratchet 28 in the housing 14 for selectively restraining rotation of the reel 20 in the one direction. With this arrangement, the reel 20 has a cord-retaining radial wall 30 on at least one side thereof disposed in closely spaced adjacent relation to a wall 32 of the housing 14 to define a radial cord expansion chamber 34 (see FIGS. 4 and 5).

As will be appreciated by referring to FIGS. 1 through 3, the housing 14 has a first opening 36 disposed about the perimeter thereof leading to the expansion chamber 34 and a second opening 38 disposed about the perimeter thereof leading from the reel 20. The first opening 36 is axially spaced from the second opening 38 by reason of the axial spacing of the expansion chamber 34 from the reel 20. In addition and as illustrated in the drawings, the housing is formed such that the first opening 36 is disposed at the bottom thereof, while the second opening 38 is oval shaped and disposed at the top thereof to enhance the utility of the invention, as best illustrated in FIGS. 2 and 3.

Referring to FIG. 1, the radial wall 30 of the reel 20 has an axially extending aperture 40 leading from the expansion chamber 34 in closely spaced adjacent relation to the axis 24 of the reel 20. It will be seen that the cord 12 extends through this aperture 40 from the expansion chamber 34 into the space defined by the cylindrical wall 22 of the reel 20. Also as shown, the cylindrical wall 22 of the reel 20 has a radially extending aperture 42 spaced from the axially extending aperture 40 in the radial wall 30 of the reel 20.

Referring specifically to FIGS. 4 and 6, the cord 12 includes a first portion 44 normally wound in a radially confined helical array about the axis 24 of the reel 20 in the expansion chamber 34. The first portion 44 of the cord 12 is maintained in an axially confined planar helical array by the radial wall 30 of the reel 20 and the housing wall 32 and is of a length to permit withdrawal of at least a portion thereof to reach the telephone 17 or telephone jack 18. As shown, the first portion 44 of the cord 12 has an end 46 extending from the first opening 36 in the housing 14 for connection to the telephone 17 or telephone jack 18.

Still referring to FIGS. 4 and 6, the cord 12 also includes a second portion 48 normally substantially entirely wound on the cylindrical wall 22 of the reel 20.

The second portion 48 of the cord 12 is of a length to permit withdrawal of at least a portion thereof by pulling on an outwardly extending part of the second portion 48 of the cord 12 to rotate the reel 20 in a direction opposite the one direction of spring biasing to accommodate movement of a telephone 50 or telephone handset 51 from one location to another. As will be seen in FIGS. 2 and 3, the second portion 48 of the cord 12 has an end 52 extending from the second opening 38 in the housing 14 for connection to the telephone 50 or telephone handset 51.

As best shown in FIG. 1, the cord 12 extends through the axially extending aperture 40 in the radial wall 30 of the reel 20 and the radially extending aperture 42 in the cylindrical wall 22 of the reel 20. It will be appreciated, of course, that the cord 12 is integral entirely along its length and, thus, the short section 53 of the cord 12 confined within the space defined by the cylindrical wall 22 of the rotatable reel 20 is merely a portion of the overall length of the cord 12 between the first portion 44 thereof and the second portion 48 thereof. Preferably, the short section 53 of the cord 12 is frictionally retained by reason of the sizing of the axially extending aperture 40 in the radial wall 30 of the reel 20 and the radially extending aperture 42 in the cylindrical wall 22 of the reel 20.

Referring now to FIGS. 5 and 7, the first portion 44 of the cord 12 will be repositioned to a radially expanded helical array within the expansion chamber 34 during withdrawal of the second portion 48 of the cord 12. It may later be desirable to retract some or all of the second portion 48 of the cord 12 into the housing 14, which is accommodated by means of the spring 26 which biases the reel for rotation in the one direction to achieve retraction when the ratchet 28 is positioned so as to offer no restraint to reel rotation. When this occurs, the first portion 44 of the cord 12 is returned to the radially confined helical array during retraction of the second portion 48 of the cord 12, as illustrated in FIGS. 4 and 6.

Referring to FIGS. 1, 4 and 6, the housing 14 includes a spindle 54 and the reel 20 is carried by the spindle 54 for rotation thereon. The spindle 54 is preferably integral with the housing 14, i.e., with the housing wall 32 in the embodiment illustrated. With this arrangement, the spring 26 is mounted so as to extend between the reel 20 and the spindle 54 of the housing 14.

In the preferred embodiment, the reel 20 has a cord retaining radial wall on both sides thereof. The spring 26 is then disposed between the radial walls 30 and 56 and radially inwardly of the cylindrical wall 22 of the reel 20. As will be appreciated, the spindle 54 extends through coaxial spindle-receiving bores 58 and 60 in the radial walls 30 and 56.

Referring specifically to FIG. 1, one of the radial walls 56 has a disc portion 56a axially recessed within the cylindrical wall 22. It will be seen that the ratchet 28, which comprises a ratchet gear 28a, a pawl lever 28b, and a spring 28c, is mounted within the axially recessed disc portion 56a of the one of the radial walls 56. With this arrangement, the ratchet 28 is contained so as to be disposed entirely within the axial recess defined by the disc portion 56a, i.e., inwardly of the flange 56b.

Preferably, the housing 14 includes a cylindrical reel receiving wall 59. The cylindrical reel-receiving wall 59 is advantageously integral with the housing wall 32 and is dimensioned so as to receive the cord-retaining radial walls 30 and 56 therein. With this arrangement, the cylindrical reel-receiving wall 59 and the reel 20 substantially entirely encase the second portion 48 of the cord 12 therebetween.

As shown in FIGS. 1 and 2, the housing 14 is preferably square in shape. The housing wall 32, which may comprise a base, includes fastener-receiving openings 60 for mounting the housing 14 on the wall 16 in proximity to the telephone 17 or telephone jack 18. Further, the housing 14 also includes a removable cover 62.

With this arrangement, the second opening 38 in the housing 14 is in the cover 62. The cylindrical reel-receiving wall 58 also has a cutout 64 aligned with the second opening 38 in the cover 62. As shown, the second portion 48 of the cord 12 extends from the reel 20 completely through the aligned opening 38 and cutout 64.

Preferably, the telephone cord 12 is flat cable and includes a plug-in connector on one end thereof for connection to the telephone 17 or telephone jack 18 and a plug-in connector on the other end thereof for connection to the telephone 50 or telephone handset 51. It will be appreciated that the flat cable readily accommodates the expansion and contraction of the helical winding array in the expansion chamber 34, although round cable could also be utilized for this purpose. In any event, by reason of the unique action in the expansion chamber 34, it is possible to form the retractable reel assembly 10 in a highly functional yet most compact manner.

As will be seen, the housing 14 will include means for retaining the cover 62 in assembled relationship with the housing wall 32. This may include expandable studs 66 adapted to extend into mating sleeves 68, after which screws 70 may be inserted from the rear of the housing wall 32 to lock the studs 66 in the sleeves 68. However, the cover 62 can be secured to the housing wall 32 in any conventional manner.

Similarly, it will be seen that the spring 26 has bent end portions 72 and 74 which are adapted for insertion into respective slots 76 and 80 formed in the cylindrical wall 22 of the reel 20 and the spindle 54. Likewise, the end 54a of the spindle 54 is noncircular in cross section to extend through a correspondingly shaped aperture 82 in the ratchet gear 28a with the screw 84 securing the ratchet gear 28a against movement relative to the housing 14. Finally, the pawl lever 28b is secured to the disc portion 56a of the radial wall 56 by means of a stud 86 which allows pivotal movement against the biasing force of the springs 28c which are secured at their opposite ends to studs 88.

As an additional feature, the retractable reel assembly 10 can advantageously be provided with an adjustable stop. The adjustable stop can have any shape so long as it is sized larger than the oval opening 38, and it is suitably disposed in slidable relation on the telephone extension cord 12 with sufficient frictional resistance to be maintained in any selected position of adjustment. In this manner, it is possible to control the amount of the cord 12 that will remain outside the retractable reel assembly 10.

While in the foregoing there has been set forth a preferred embodiment of the invention, it is to be understood that the invention is only to be limited by the spirit and scope of the appended claims.

I claim:

1. A retractable reel assembly for a telephone extension cord, comprising:

a housing adapted to be mounted on a wall in proximity to a telephone or telephone jack;

a reel defined by a cylindrical wall journaled for rotation about an axis in said housing;

a spring for biasing said reel for rotation in one direction, said spring being mounted to extend between said housing and said reel;

a ratchet in said housing for selectively restraining rotation of said reel in said one direction;

said reel having a cord-retaining radial wall on at least one side thereof, said radial wall being disposed in closely spaced axially adjacent relation to a wall of said housing and being adapted for rotational movement relative to said wall of said housing, said radial wall and said housing wall defining a radial cord expansion chamber in said housing;

said housing having a first opening disposed about the perimeter thereof leading to said expansion chamber, said housing having a second opening disposed about the perimeter thereof leading from said reel;

said first opening being axially spaced from said second opening;

said radial wall of said reel having an axially extending aperture leading from said expansion chamber in closely spaced adjacent relation to said axis of said reel, said cylindrical wall of said reel having a radially extending aperture spaced from said axially extending aperture in said radial wall of said reel;

said cord including a first portion normally being wound in a radially confined helical array about said axis of said reel in said expansion chamber, said first portion of said cord being maintained in an axially confined planar helical array by said radial wall of said reel and said housing wall and being of a length to permit withdrawal of at least a portion thereof to reach said telephone or telephone jack, said first portion of said cord having an end extending from said first opening in said housing for connection to said telephone jack or a telephone handset;

said cord extending through said axially extending aperture in said radial wall of said reel and said radially extending aperture in said cylindrical wall of said reel;

said cord also including a second portion normally being substantially entirely wound on said cylindrical wall of said reel, said second portion of said cord being of a length to permit withdrawal of at least a portion thereof by pulling on said second portion of said cord to rotate said reel in a direction opposite said one direction to accommodate movement of said telephone or telephone handset from one location to another, said second portion of said cord having an end extending from said second opening in said housing for connection to said telephone or telephone handset;

said spring accommodating retraction of said second portion of said cord by biasing said reel for rotation in said one direction;

said first portion of said cord being unwound to a radially expanded helical array within said expansion chamber during substantially complete withdrawal of said second portion of said cord and being rewound to said radially confined helical array within said expansion chamber during substantially complete retraction of said second portion of said cord.

2. The retractable reel assembly as defined by claim 1 wherein said housing includes a spindle and said reel is carried by said spindle for rotation thereon, said spindle being integral with said housing and said spring being mounted to extend between said reel and said spindle of said housing.

3. The retractable reel assembly as defined by claim 2 wherein said reel has a cord-retaining radial wall on both sides thereof, said spring being disposed between said radial walls and radially inwardly of said cylindrical wall of said reel, said spindle extending through coaxial spindle-receiving bores in said radial walls.

4. The retractable reel assembly as defined by claim 1 wherein said reel has a cord-retaining radial wall on both sides thereof, one of said radial walls having a disc portion axially recessed within said cylindrical wall, said ratchet being nested within said axially recessed disc portion of said one of said radial walls.

5. The retractable reel assembly as defined by claim 4 wherein said housing includes a spindle and said reel is carried by said spindle for rotation thereon, said spindle being integral with said housing and said spring being mounted to extend between said reel and said spindle of said housing.

6. The retractable reel assembly as defined by claim 5 wherein said reel has a cord-retaining radial wall on both sides thereof, said spring being disposed between said radial walls and radially inwardly of said cylindrical wall of said reel, said spindle extending through coaxial spindle-receiving bores in said radial walls.

7. The retractable reel assembly as defined by claim 1 wherein said housing includes a cylindrical reel-receiving wall, said cylindrical reel-receiving wall being dimensioned so as to receive said cord-retaining radial wall therein, said cylindrical reel-receiving wall and said reel substantially entirely encasing said second portion of said cord therebetween.

8. The retractable reel assembly as defined by claim 7 wherein said housing includes a spindle and said reel is carried by said spindle for rotation thereon, said spindle being integral with said housing and said spring being mounted to extend between said reel and said spindle of said housing, 9. The retractable reel assembly as defined by claim 8 wherein said reel has a cord-retaining radial wall on both sides thereof, said spring being disposed between said radial walls and radially inwardly of said cylindrical wall of said reel, said spindle extending through coaxial spindle-receiving bores in said radial walls.

10. The retractable reel assembly as defined by claim 1 wherein said housing is square in shape, said housing wall including fastener-receiving openings for mounting said housing in proximity to said telephone or telephone jack, said housing also including a removable cover.

11. A retractable reel assembly for a telephone extension cord, comprising:

a housing adapted to be mounted on a wall in proximity to a telephone or telephone jack;

a reel defined by a cylindrical wall journaled for rotation about an axis in said housing;

a spring for biasing said reel for rotation in one direction, said spring being mounted to extend between said housing and said reel;

a ratchet in said housing for selectively restraining rotation of said reel in said one direction;

said reel having a cord-retaining radial wall on both sides thereof, one of said radial walls being disposed in closely spaced axially adjacent relation to a wall of said housing and being adapted for rotational movement relative to said wall of said housing, and the other of said radial walls having a disc portion axially recessed within said cylindrical wall, said one of said radial walls and said housing wall defining a radial cord expansion chamber in said housing;

said ratchet being mounted within said axially recessed disc portion of the other of said radial walls;

said housing having a first opening disposed about the perimeter thereof leading to said expansion chamber, said housing having a second opening disposed about the perimeter thereof leading from said reel;

said first opening being axially spaced from said second opening;

said radial wall of said reel having an axially extending aperture leading from said expansion chamber in closely spaced adjacent relation to said axis of said reel, said cylindrical wall of said reel having a radially extending aperture spaced from said axially extending aperture in said radial wall of said reel;

said cord including a first portion normally being wound in a radially confined helical array about said axis of said reel in said expansion chamber, said first portion of said cord being maintained in an axially confined planar helical array by said radial wall of said reel and said housing wall and being of a length to permit withdrawal of at least a portion thereof to reach said telephone or telephone jack, said first portion of said cord having an end extending from said first opening in said housing for connection to said telephone or a telephone jack;

said cord extending through said axially extending aperture in said radial wall of said reel and said radially extending aperture in said cylindrical wall of said reel;

said cord also including a second portion normally being substantially entirely wound on said cylindrical wall of said reel, said second portion of said cord being of a length to permit withdrawal of at least a portion thereof by pulling on said second portion of said cord to rotate said reel in a direction opposite said one direction to accommodate movement of said telephone or telephone handset from one location to another, said second portion of said cord having an end extending from said second opening in said housing for connection to said telephone or telephone handset;

said spring accommodating retraction of said second portion of said cord by biasing said reel for rotation in said one direction;

said first portion of said cord being unwound to a radially expanded helical array within said expansion chamber during substantially complete withdrawal of said second portion of said cord and being rewound to said radially confined helical array within said expansion chamber during substantially complete retraction of said second portion of said cord.

said housing including a spindle and said reel being carried by said spindle for rotation thereon, said spindle being integral with said housing, said spring being mounted to extend between said reel and said spindle of said housing.

12. The retractable reel assembly as defined by claim 11 wherein said spring is disposed between said radial walls and radially inwardly of said cylindrical wall of said reel, and including means associated with said spindle and said cylindrical wall of said reel for securing said spring thereto, said spindle extending through coaxial spindle-receiving bores in said radial walls.

13. The retractable reel assembly as defined by claim 12 wherein said housing is square in shape, said housing wall including fastener-receiving openings for mounting said housing in proximity to said telephone or telephone jack, said housing also including a removable cover.

14. The retractable reel assembly as defined by claim 13 wherein said second opening in said housing is in said cover, said cylindrical reel-receiving wall having a cutout aligned with said second opening in said cover, said second portion of said cord extending from said reel completely through said aligned opening and cutout.

15. The retractable reel assembly as defined by claim 14 wherein said telephone cord is a flat cable and includes a plug-in connector on one end thereof for connection to said telephone jack or telephone and a plug-in connector on the other end thereof for connection to said telephone or telephone handset.

* * * * *